June 18, 1940.　　　　J. F. CORNELL　　　　2,205,372
CAGE FOR ROLLER BEARINGS
Filed Oct. 26, 1939
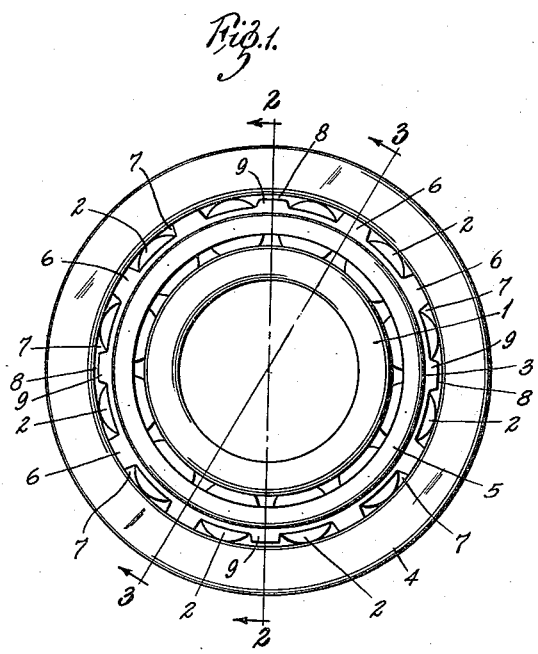
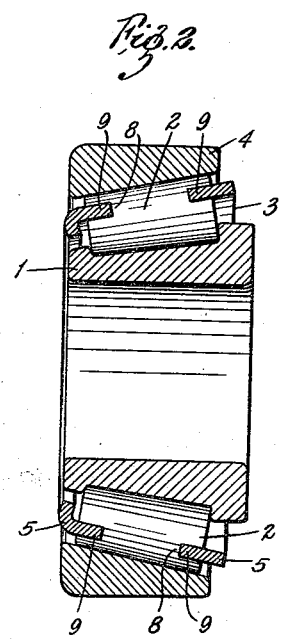
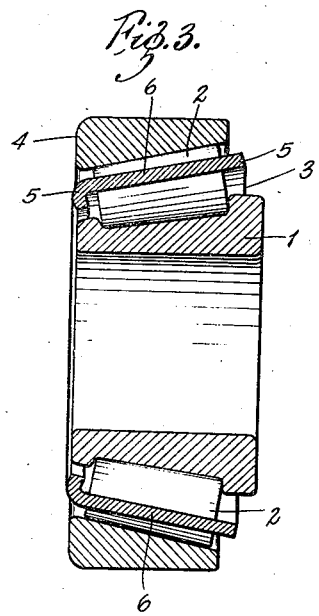
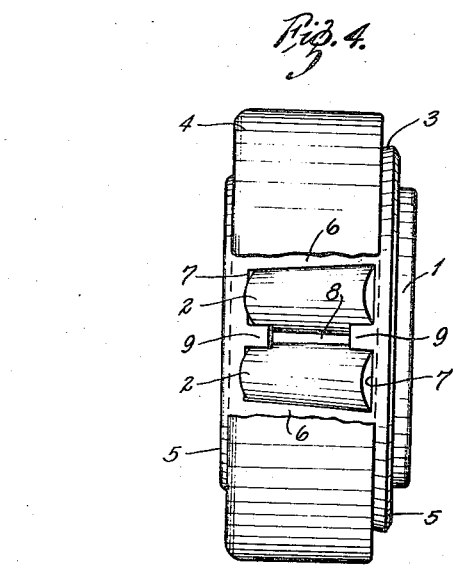
INVENTOR:
Joseph F. Cornell,
by Carr Karr & Gravely,
HIS ATTORNEYS.

Patented June 18, 1940

2,205,372

UNITED STATES PATENT OFFICE 2,205,372

CAGE FOR ROLLER BEARINGS

Joseph F. Cornell, Minneapolis, Minn., assignor to The Timken Roller Bearing Company, Canton, Ohio, a corporation of Ohio Application October 26, 1939, Serial No. 301,310

5 Claims. (Cl. 308—218)

This invention relates to cages for roller bearings. The principal objects of this invention are to devise a simple and practical roller bearing cage construction which will facilitate inspection of a bearing and which will provide for improved lubrication of the bearing. The invention consists in a bearing cage which has the central portion of some of the bridges cut away. It further consists in the cage and in the parts and combinations and arrangements of parts hereinafter described and claimed.

In the accompanying drawing, which forms part of this specification and wherein like reference numerals refer to like parts wherever they occur, Fig. 1 is an end view of a roller bearing embodying my invention, Fig. 2 is a sectional view on the line 2—2 in Fig. 1, Fig. 3 is a sectional view on the line 3—3 in Fig. 1; and Fig. 4 is a side view with a portion of the cup or outer raceway broken away.

In the accompanying drawing, a roller bearing construction is shown having a cone or inner raceway member 1, a series of rollers 2, a cage 3, and a cup or outer raceway member 4. The cage 3 consists of annular end portions 5 connected by bridges 6 disposed radially outward of the roller axes. These bridges are spaced to form pockets 7 adapted to receive the rollers of the bearing. The sides of the bridges are shaped to fit the rollers and permit them to project beyond the cage so as to engage the cup or outer raceway member. However, the pockets are small enough to prevent the rollers from passing completely therethrough.

So far, the ordinary cage construction has been described. One or more of the bridges connecting the annular end portions have their central portion cut away to form a central opening or gap 8 between the remaining truncated portions 9. These short bridges 9 serve as do the full length bridges 6 in spacing the rollers and retaining them in proper position. Any desired number of the bridges may have their central portions cut away providing that a suitable number are retained to insure sufficient strength for the cage.

With present conventional cage constructions, it is necessary to remove the cage and the rollers to inspect the cone or inner raceway member of a bearing. In most cases, such removal destroys the cage, thereby necessitating its replacement in reassembling the bearing. With my invention, the cone or inner raceway of a roller bearing may be inspected without removing the cage and rollers. This results in a saving of time and money.

My construction provides for better bearing lubrication, especially in a grease lubricated bearing. In such a bearing, the central openings in the cut away bridge permits some grease to work out of the cage and on to the cup or outer raceway member and thereby directly lubricate the surface of the cup or outer raceway member.

Obviously numerous changes may be made without departing from the invention and I do not want to be limited to the precise construction shown.

What I claim is:

1. A cage for roller bearings comprising annular end members connected by bridges forming pockets for retaining the rollers, a plurality of said bridges having an opening of substantial size in the central portion thereof.

2. A cage for roller bearings comprising annular end members connected by bridges forming pockets for retaining the rollers, one of said bridges having an opening of substantial size in the central portion thereof.

3. A cage for roller bearings comprising annular end members connected by bridges forming pockets for retaining the rollers, some of said bridges having their central portions removed, leaving truncated bridge portions projecting from said end members.

4. A roller bearing comprising an inner bearing member, rollers thereon and a cage for said rollers comprising annular end members connected by bridges forming pockets for said rollers, one of said bridges having enough of its central portion removed to constitute an opening for inspecting said inner bearing member.

5. A roller bearing comprising an inner bearing member, rollers thereon and a cage for said rollers comprising annular end members connected by bridges forming pockets on said rollers, some of said bridges having enough of their central portions removed to constitute openings for inspecting said inner bearing member.

JOSEPH F. CORNELL.